J. W. PEPPLE.
DIRIGIBLE HEADLIGHT.
APPLICATION FILED SEPT. 20, 1915.
1,186,935.
Patented June 13, 1916.
2 SHEETS—SHEET 1.
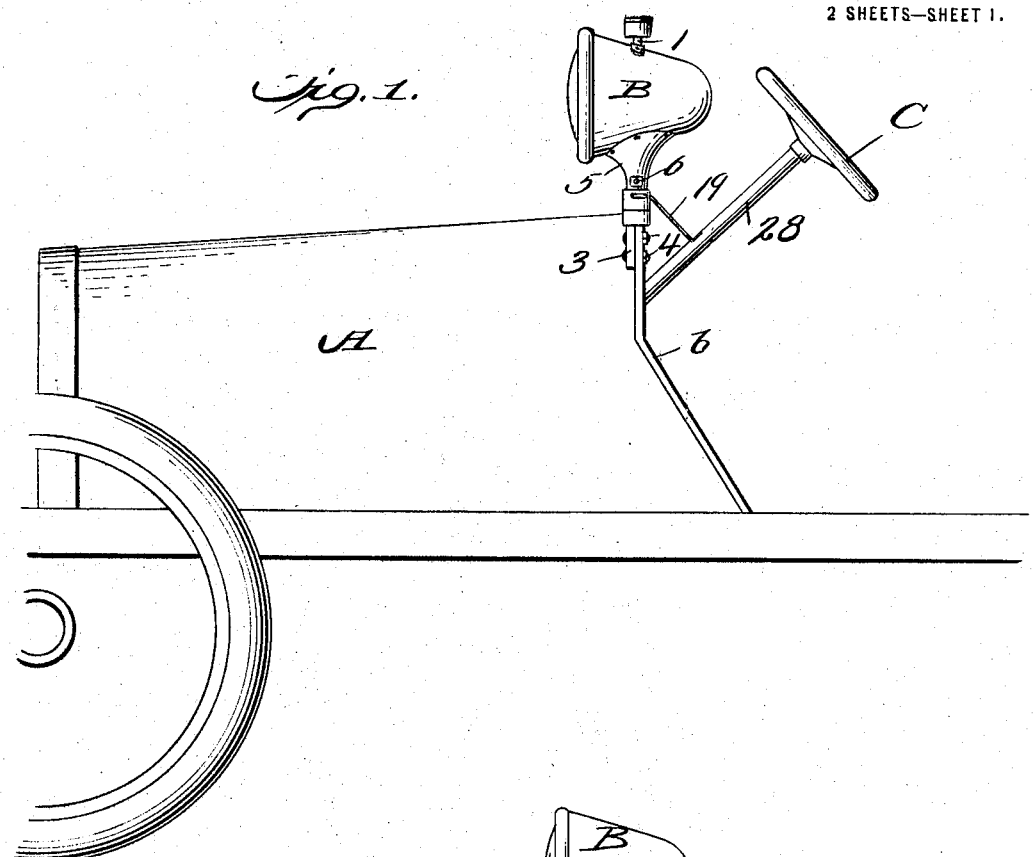
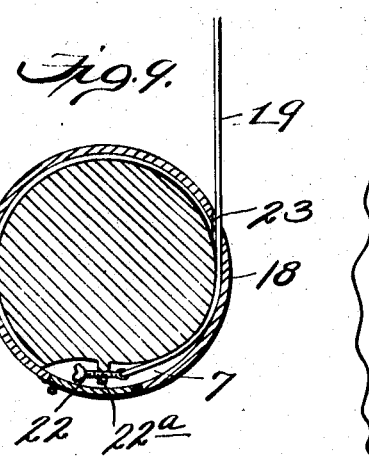
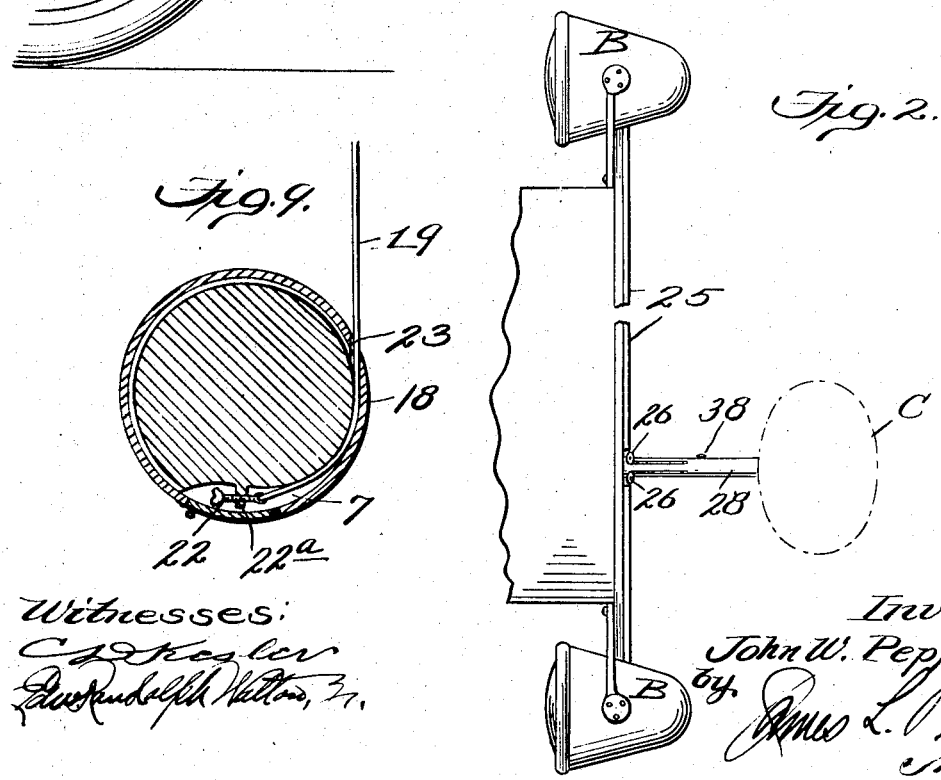
Witnesses:
Inventor
John W. Pepple

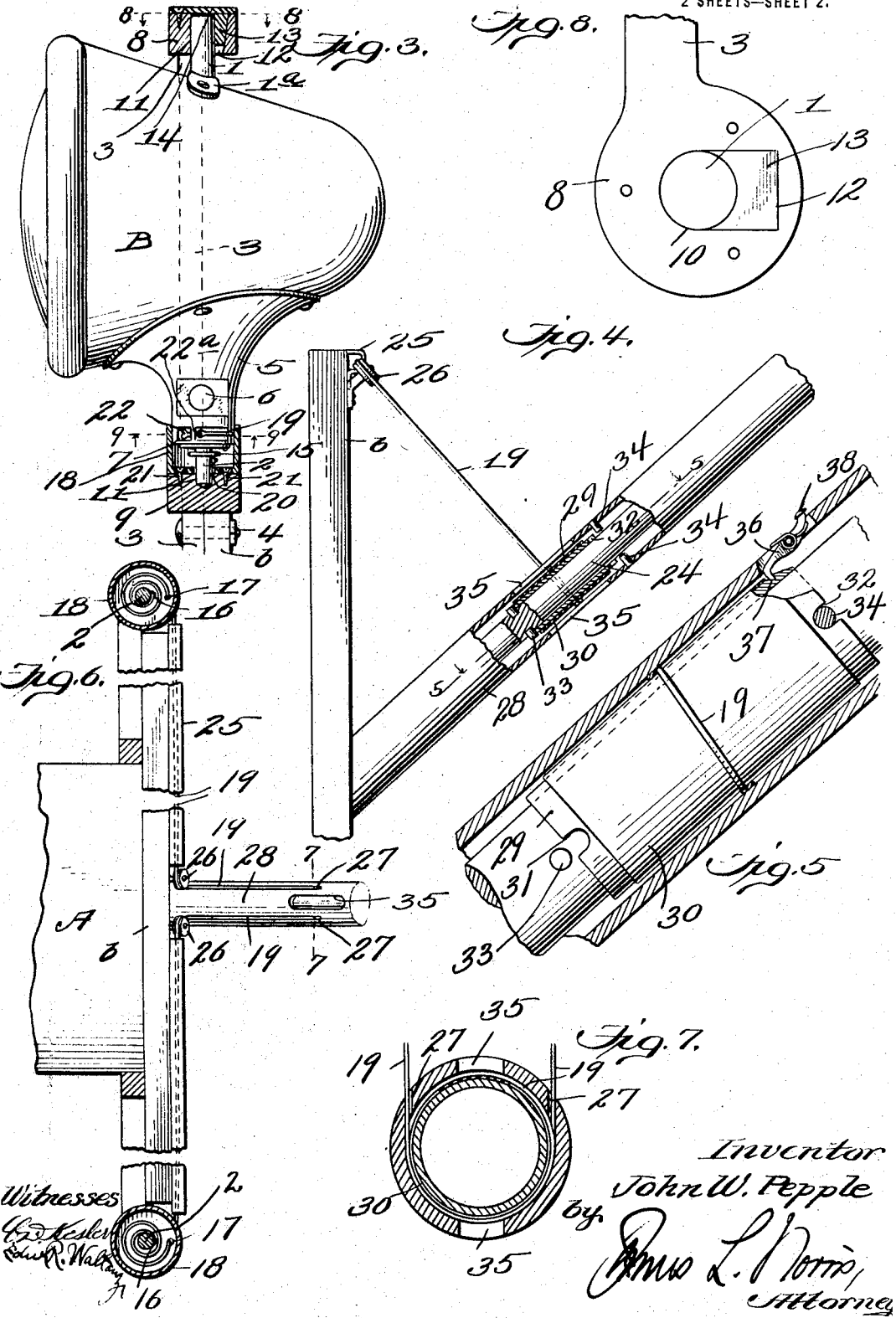

UNITED STATES PATENT OFFICE.

JOHN W. PEPPLE, OF SAN ANTONIO, TEXAS.

DIRIGIBLE HEADLIGHT.

1,186,935.　　　　Specification of Letters Patent.　　Patented June 13, 1916.

Application filed September 20, 1915. Serial No. 51,689.

*To all whom it may concern:*

Be it known that I, JOHN W. PEPPLE, a citizen of the United States, residing at San Antonio, in the county of Bexar and State of Texas, have invented new and useful Improvements in Dirigible Headlights, of which the following is a specification.

The present invention relates to dirigible headlights, and pertains more particularly to such headlights as are operated from the steering gear of an automobile.

An object of the invention is to produce a dirigible headlight operable from the steering gear of an automobile which is void of all gears, racks and pinions, and in which loose parts and the rattle which is usually an attribute of devices of this character are entirely eliminated.

It is also an object of the invention to produce a device of the above character which will operate with efficiency, which may be manufactured at comparatively little expense, and which consists of few and durable parts and may be easily applied to a machine.

One feature of the invention is to provide a dirigible headlight which is pivotally mounted in suitable brackets in such a manner as will eliminate all rattle caused by the vibration of the movable lamp thereon.

Another feature of the invention resides in the mechanism secured to the lower pivot portion of the lamp for turning the latter, and, which comprises a coil spring surrounding said pivot and normally tending to turn the lamp in one direction, and a flexible member in wound engagement with said pivot and adapted to turn the lamp in the other direction, said flexible member being wound around the rotating steering shaft of the vehicle so as to feed thereover upon rotation of the latter and produce the movement of the lamp in a direction against the action of said spring.

It is a further feature of the invention to provide a sleeve loose upon said shaft and slidable into and out of locked engagement therewith and having said flexible member immediately wound thereupon so that the dirigible operation of the lamps may be discontinued, when desired, by sliding said sleeve out of locking engagement with said steering shaft.

With the above and other objects in view, the invention further consists in a certain novel construction, arrangement and combination of parts hereinafter more fully described and finally pointed out in the appended claims.

In the drawings, which are to be considered in connection with the specification:—

Figure 1 is a fragmentary view of an automobile illustrating the dirigible lamps constructed according to the present invention operatively mounted thereupon. Fig. 2 is a fragmentary plan view of Fig. 1. Fig. 3 is a sectional view showing the detail construction of the operating mechanism and the manner in which the lamp is mounted in a supporting bracket. Fig. 4 is a fragmentary side elevation of a portion of an automobile with parts broken away to illustrate in detail the construction and application of the invention to the steering shaft thereof. Fig. 5 is a detail sectional view taken on line 5—5 of Fig. 4. Fig. 6 is a plan view of a portion of an automobile similar to Fig. 4 and illustrating in detail the application of certain operating parts of the invention thereto. Fig. 7 is a sectional view taken on the line 7—7 of Fig. 6. Fig. 8 is a view taken on line 8—8 of Fig. 3. Fig. 9 is a view taken on line 9—9 of Fig. 3.

Like characters denote similar parts throughout the specification and drawings.

The vehicle to which the present invention is applied is indicated by the letter A, and, as here shown, it is preferred to mount the lamps upon or adjacent the dashboard of the vehicle for purposes which will be well understood, however, it is to be understood that the lamps may be located on any desired or convenient portion of the automobile and the invention may be easily applied and operated with equal efficiency.

The lamp proper B is pivoted upon vertically projecting trunnions 1 and 2 in a two-armed bracket 3 secured to the dashboard *b* of the vehicle by the fastening means 4. It is preferred to provide on the under side of the lamp a base or drum-like member 5. Said member 5 may have any preferred construction and may be so formed and constructed as to house the lamps, as indicated at 6, which may be used as sidelights when the use of the large headlights B is not desired. However, the lower end of said member is formed to provide a grooved drum 7, from the extremity of which extends the lower trunnion 2 of the lamp. The member 5 may be, as here shown, suitably applied or secured to the lamp, as by riveting, or may be made integral with the latter, as may be desired. The trunnion 1 may be formed integral with the lamp, but it is preferred, as shown in the present embodiment, to have the same extend from a plate 1ª riveted or otherwise secured to the lamp B.

In practice, it is proposed to use two headlights B, as shown in Figs. 1, 2 and 6, which move in unison, in a manner hereinafter described, but since the specific construction of the mounting and the operating mechanism for each lamp is identical, only one lamp will be specifically referred to.

The upper arm 8 and the lower arm 9 of the bracket 3 are formed with alined apertures or openings 10 and 11, respectively. The opening 11 of the arm 9 does not, preferably, extend through the arm but only provides a round recessed bearing adapted to snugly accommodate the trunnion 2. The aperture 10 of the upper arm 8 is enlarged and extends therethrough and is adapted to receive the trunnion 1 of the lamp. A portion of the wall of the aperture 10 is so formed as to provide a wedge slot 12 adapted to lie adjacent that portion of said aperture designed to accommodate the trunnion 1, the slot 12 having received therein the wedge 13 of leather or other suitable material designed to jam the trunnion 1 against the walls of the aperture and tightly hold the same against rattle, caused by vibration of the automobile. A cap 14 is removably secured to the outer extremity of the bracket and is adapted to lie over the aperture 8 and slot 12 and thus retain the wedge 13 and the trunnions 1 and 2 in the position shown. Surrounding each trunnion 2 of the lamps B is a coil spring 15 having one end secured to said trunnion, as at 16, and the other end fastened, as at 17, to a housing 18. The function of the springs 15 is to normally exert tension for turning the lamps outwardly from the vehicle and to coöperate in conjunction with a cable 19 for causing the oscillating movement of the lamps in a manner corresponding to the movement of the steering wheels of the vehicle, as will be hereinafter more fully set forth. The housing 18 is here shown as cup-shape and formed in its bottom with an aperture 20 through which the trunnion 2 extends. When assembled, the housing 18 is secured in any suitable manner, as by means of the screws 21, to the arm 9 of the bracket, and has its side walls extending upwardly for a distance beyond the drum portion 7 of the member 5 so as to envelop the operating parts of the lamp and inclose the same from dust and observation.

The cable 19 is partially wound around the grooved drum 7 of the base member 5 and is secured thereto by any approved adjusting means 22 and is extended through an opening 23 in the housing to operatively engage with the rotating steering shaft 24 of the vehicle.

When two headlights are supported on opposite sides of the vehicle, as is shown in the drawings, a single cable is used having its opposite ends connected with the drum 7 of each respective lamp and its intermediate portion wound about the rotating steering shaft 24. The cable 19 passes from the lamps through a molding or casing 25, secured to the dashboard of the vehicle, over the sheaves or pulleys 26 and thence through a slot 27 formed in the casing 28 provided for the steering shaft 24. The adjusting means, here shown, for securing the ends of the cable 19 to the drums 7 of the lamps, consists of a threaded thumb-screw 22 having the cable secured to one end thereof. The thumb-screw 22 is threaded in a radially extending lug 22ª projecting from the groove formed in the drum portion 7 of the member 5. The portions of the drum 7 adjacent the lug 22ª are cut away so as to permit access to and easy rotation of the screw 22. It will thus be seen that, by adjusting the screw 22, the slack in the cable 19 may be taken up or varied, as desired and that, when the lamps are properly adjusted to direct their light in a plane parallel with the longitudinal axis of the car, the springs 15 will exert tension upon the cable and constantly hold the same taut. This tension exerted by the springs 15 upon the cable 19 also tends to hold the lamps B in their bearings against rattling.

Although, as here shown, the lamps B are disposed on the dashboard of the vehicle, it may be found desirable to place the same on any portion of the car, in which event additional pulleys or sheaves 26 are required to guide the cable 19 to the drum portions 7 of the lamps. It will also be understood that it is contemplated to extend the casing or molding 25 accordingly to shield and cover the cable 19.

This invention contemplates means for rendering the dirigible lights B inoperative in daytime or at such times when it is desired to have the lights remain stationary. The means for accomplishing this purpose is shown in Figs. 4 and 5, and consists of a sleeve 29 loosely mounted on the steering shaft 24 of the vehicle, the cable 19, extending through the slots 27 in the casing 28, being tightly wound around said sleeve. The sleeve 29 is substantially enveloped by a covering 30 of rubber or like material with which the cable 19 frictionally grips, thus rendering the cable sensitive to the slightest rotating movement of the sleeve. The peripheral edges of the sleeve 29 are formed with suitable recesses 31 and 32 in their opposite ends. The recesses 31 and 32 of each end of the sleeve, respectively, are preferably diametrically opposite, the recesses 31 being designed to engage with the radial lugs 33 extending from the shaft 24, and the recesses 32 being arranged to engage with the inwardly extending lugs 34 projecting from the casing 28 of the shaft 24. Elongated finger openings or slots 35 are diametrically formed in the casing 28 and so arranged and positioned that the operator of the car may grasp the sleeve 29 and slide the same upon the shaft 24 into and out of locking engagement with the lugs 33 and 34, in a manner as will be well understood. Therefore, when it is desired to have the headlights B operate so as to direct their light in the direction of movement of the car, the sleeve 29 is moved down on the shaft 24 so that the recesses 31 will engage with its lugs 33 and thus lock the sleeve with the shaft 24 for rotation which will consequently effect the movement of the lamps when the steering wheel C is turned in either direction. When it is desired to have the lamps B stand stationary, the sleeve is moved upwardly so that the recesses 32 will engage with its lugs 34 of the casing 28, which lugs will prevent the sleeve from being rotated by the shaft 24, the lugs 33 and 34 being arranged at such a distance apart and with respect to the sleeve that, when the sleeve is slid on the shaft a slight degree so as to bring the engaging lugs out of engagement with their respective recesses, the recesses in the opposite end of the sleeve will be embracing their respective lugs.

When the sleeve is moved into a stationary position, as shown in Fig. 5, the spring catch 36 will engage with the recess 37 formed in the upper end of the sleeve 29 so as to retain the sleeve in its position and prevent the same from sliding downwardly on the shaft 24. The spring catch is formed with a suitable button 38 for permitting the same to be operated to release the sleeve 29. The specific form of catch, here shown, may be modified as desired, and any means may be provided for holding the sleeve in its position upon the shaft 24.

From the foregoing it will be obvious that applicant has provided novel dirigible headlights for vehicles which are operated from the rotating steering shaft of the vehicle and which are void of all gears, racks and pinions and are so constructed as to eliminate any rattle which may be occasioned by the vibration of operating parts. It is understood that the cable 19 turns each lamp in one direction and that the spring 15 thereof turns the same in the opposite direction when the intermediate portion of the cable 19, wound around the sleeve 29, is fed thereover by the rotating movement of the shaft 24.

It is believed that the foregoing is a clear and accurate description of the present invention. However, it is to be understood that certain changes as to the precise and exact construction and combination and arrangement of parts may be resorted to that fall within the legitimate scope of the appended claims.

Having fully described my invention, I claim:

1. In a dirigible headlight, the combination with a steering shaft of a vehicle, of a pivoted lamp mounted on the vehicle, means connected with the lamp normally tending to turn the same in one direction, a flexible element wound around said shaft and having one end in wound engagement with the pivot portion of the lamp, whereby the movement of the shaft is imparted to said lamp to turn the latter in a direction against the action of said spring, and an adjustable member for securing said end of said flexible element to the lamp, whereby the slack in said element may be taken up or increased.

2. In a dirigible headlight, the combination with the lamps and steering shaft of a vehicle, of pivot members secured to the lamps for rendering the latter pivotal on the vehicle, a sleeve on said shaft and slidable into and out of locking engagement with the shaft, whereby the sleeve is rotated, a flexible connecting element in wound engagement with a pivot member of each lamp and with said sleeve, whereby the movement of the shaft is imparted to the lamps when said sleeve is locked with said shaft.

3. In a dirigible headlight, the combination with a vehicle lamp, of trunnions extending from said lamp, a two-armed supporting bracket for said lamp having one arm formed with a bearing opening to snugly accommodate one of said trunnions, the other of said arms being formed with an aperture to accommodate the other of said trunnions and with a wedge slot adjacent to and forming an enlargement of said aperture, a wedge of soft material introduced in said slot, and a movable plate for closing the outer end of said aperture and slot, and means connecting one of said trunnions with the steering gear of the vehicle, whereby said lamp is rotated on said bracket.

4. In a dirigible headlight, the combination with a lamp and steering shaft of a vehicle, of a drum member mounted on said lamp, a bracket pivotally supporting said lamp, spring means normally tending to turn said member in one direction, a flexible connecting element in wound engagement with said drum member and with said shaft, and adapted to turn said member in an opposite direction upon the corresponding rotary movement of said shaft.

5. In a dirigible headlight, the combination with a lamp and steering shaft of a vehicle, of a base member mounted on said lamp and formed with a drum portion, a bracket on which said base member is pivotally mounted, a housing supported on said bracket and adapted to inclose said drum and pivoted portions of said base member, spring means within said housing and normally tending to turn said member in one direction, a flexible connecting element extended through said housing and in wound engagement with said drum portion and with said steering shaft and adapted to turn said member in an opposite direction when said shaft is correspondingly rotated.

6. In a dirigible headlight, the combination with a lamp and steering shaft of a vehicle, of a base member formed with a drum portion and mounted on said lamp, a bracket pivotally supporting said member, a lug projecting from said drum portion, a screw adjustably threaded in said lug, a flexible connecting element in wound engagement with said shaft and drum portion, the end of said element engaging with said drum portion being secured to said adjusting screw whereby the slack in said element may be varied.

7. In a dirigible headlight, the combination with a lamp and steering shaft of a vehicle, of a base member formed with a drum portion and mounted on said lamp, a bracket pivotally supporting said member, a spring normally tending to turn said member in one direction, a lug projecting from said drum portion, a screw adjustably threaded in said lug, a flexible connecting element in wound engagement with said shaft and drum portion and adapted to turn said member in the opposite direction when said shaft is correspondingly rotated, said spring holding said flexible connection taut, the end of said element engaging with said drum portion being secured to said adjusting screw whereby the normal position of said lamps may be adjusted.

8. In a dirigible headlight, the combination with a lamp and steering shaft of a vehicle, of a base member formed with a drum portion and mounted on the lamp, a bracket pivotally supporting said member, a spring normally tending to turn said member in one direction, a lug projecting from said drum portion, a screw adjustably threaded in said lug, a flexible connecting element in wound engagement with said shaft and drum portion and adapted to turn said member in the opposite direction when said shaft is correspondingly rotated, said spring holding said flexible connection taut, the end of said element engaging with said drum portion being secured to said adjusting screw whereby the normal position of said lamps may be adjusted, and a housing supported on said bracket and inclosing said spring and drum portions.

9. In a dirigible headlight, the combination with a steering shaft of an automobile, of pivoted lamps mounted on said automobile, a sleeve slidably mounted on said rotating steering shaft and having a movement longitudinally thereof, means on said shaft and sleeve for locking the latter for rotation with the shaft when said sleeve is slid into one position, a flexible element having each end thereof connected with the lamps of the vehicle and having an intermediate portion in wound engagement with said sleeve whereby rotating movement of said shaft will be imparted to said lamps when the sleeve is locked to the shaft, and means for holding said sleeve inoperative when the latter is slid into its other position.

10. In a dirigible headlight, the combination with a steering shaft of an automobile, of pivoted lamps mounted on said automobile, a sleeve loosely mounted upon said shaft and having a movement longitudinally thereof, means on said shaft and sleeve for locking the latter for rotation with the shaft when said sleeve is slid into one position, a flexible element connected with the lamps of the vehicle and having a portion thereof in wound engagement with said sleeve whereby rotating movement of said shaft will be imparted to said lamps when the sleeve is locked to the shaft, and means for placing said flexible element under tension, and means for holding said sleeve inoperative when the latter is slid into its other position.

11. In a dirigible headlight, the combination with a steering shaft of an automobile, of pivoted lamps mounted on said automobile, a sleeve loosely mounted upon said shaft and having a movement longitudinally thereof, means on said shaft and sleeve for locking the latter for rotation with the shaft when said sleeve is slid into one position, a flexible element having each end thereof connected with the lamps of the vehicle and having an intermediate portion in wound engagement with said sleeve whereby rotating movement of said shaft will be imparted to said lamps when the sleeve is locked to the shaft, and spring means normally tending to turn said lamps in a direction opposite to that effected by said flexible member and to place the latter under tension, and means for holding said sleeve inoperative when the latter is slid into its other position.

In testimony whereof I have hereunto set my hand in presence of two subscribing witnesses.

JOHN W. PEPPLE.

Witnesses:
 EDW. R. WALTON, Jr.,
 ROSE M. SEFTON.